United States Patent [19]

Ording et al.

[11] Patent Number: 5,082,223
[45] Date of Patent: Jan. 21, 1992

[54] ADJUSTABLE MOUNTING ASSEMBLY FOR ELECTRO-OPTICAL DEVICES

[75] Inventors: Leroy E. Ording, Northville; Otto W. Freitag, Dearborn, both of Mich.

[73] Assignee: Ford Motor Company, Dearborn, Mich.

[21] Appl. No.: 628,032

[22] Filed: Dec. 17, 1990

[51] Int. Cl.⁵ ............................................. F16M 11/00
[52] U.S. Cl. ........................................ 248/183; 248/278
[58] Field of Search ............... 248/278, 183, 176, 276, 248/279, 280.1

[56] References Cited

U.S. PATENT DOCUMENTS

| | | | |
|---|---|---|---|
| 2,538,640 | 1/1951 | Click | 248/183 X |
| 2,900,159 | 8/1959 | Mattox | 248/278 X |
| 2,933,278 | 4/1960 | Heise | 248/278 X |
| 3,436,050 | 4/1969 | Tibbals, Jr. | 248/278 X |
| 3,596,863 | 8/1971 | Kaspareck | 248/278 X |
| 3,603,545 | 1/1972 | Boniface . | |
| 3,661,376 | 5/1972 | Hill et al. . | |
| 3,814,365 | 6/1974 | Mackenzie | 248/278 |
| 4,673,268 | 6/1987 | Wheeler et al. . | |
| 4,797,916 | 1/1989 | Kojima | 248/183 X |
| 4,828,376 | 5/1989 | Padera . | |
| 4,838,117 | 6/1989 | Bittner . | |

FOREIGN PATENT DOCUMENTS 2033059 1/1972 Fed. Rep. of Germany ...... 248/183

*Primary Examiner*—David L. Talbott
*Attorney, Agent, or Firm*—Raymond L. Coppiellie; Roger L. May

[57] ABSTRACT

An adjustable mounting assembly for adjusting an electro-optical inspection device secured to a substantially fixed carrier about two mutually orthogonal axes includes a bracket adapted to be secured to the inspection device and a first substantially planar plate pivotally secured to the bracket by a first fastening member, the first fastening member defining a first of the two mutually orthogonal axes. The mounting assembly further includes a first adjustment means disposed between the first plate and the bracket for adjusting the bracket relative to the first plate about the first axis as well as a second substantially planar plate attached to the first plate by a second fastening member, the second fastening member defining the second of the two mutually orthogonal axes. The mounting assembly also includes a second adjustment means engaging the first and second plates for adjusting the first plate relative to the second plate about the second axis.

2 Claims, 2 Drawing Sheets

ADJUSTABLE MOUNTING ASSEMBLY FOR ELECTRO-OPTICAL DEVICES

BACKGROUND OF THE INVENTION

1. Field of the Invention

The present invention relates generally to mounting assemblies for electro-optical devices such as cameras, laser measurement devices and the like. More particularly, the present invention relates to an adjustable mounting assembly for electro-optical devices capable of precision manual adjustment about two mutually orthogonal axes.

2. Disclosure Information

Electro-optical inspection devices such as cameras, lasers and other like devices are very sensitive to positional changes. Gross positional adjustments of such devices may be accomplished with any of a variety of known adjustment techniques ranging from physically striking the camera to software based compensation as well as known mounting assemblies. However, fine precision adjustments on the order of 0.001 inches to 0.10 inches from a predetermined axis are difficult to obtain without a very complex, expensive adjustment apparatus or mounting assembly.

For example, U.S. Pat. Nos. 4,673,268; 4,838,117; 3,603,545; and 4,828,376 all disclose adjustable mounting assemblies capable of precision adjustments. However, all of the disclosed systems utilize complex, electro-mechanical devices to achieve such adjustments.

U.S. Pat. No. 3,661,376 discloses a work support device having a manually actuatable clamping device for locking the support device in the desired position. However, the "376 device is not capable of precision adjustments of the magnitude described above.

It is a feature of the present invention to provide a mounting assembly for electro-optical inspection devices which is manually adjustable about two mutually orthogonal axes.

It is an object of the present invention to provide an adjustable mounting assembly having a minimum number of moving parts and which is capable of fine precision adjustment by means of threaded rod fasteners.

These and other features, objects and advantages of the present invention will become apparent from the summary, description, drawings and claims which follow.

SUMMARY OF THE INVENTION

There is disclosed herein an adjustable mounting assembly for adjusting an electro-optical inspection device secured to a substantially fixed carrier about two mutually orthogonal axes. The mounting assembly comprises a bracket adapted to be secured to the inspection device, and a first substantially planar plate secured to the bracket by a first fastening member. The first fastening member defines a first axis of the two mutually orthogonal axes about which the device can be adjusted. The assembly further includes a first adjustment means disposed between the first plate and the bracket for pivotal adjustment of the first plate relative to the bracket about the first axis The mounting assembly also includes a second substantially planar plate attached to the first plate by a second fastening member, the second fastening member defining a second axis of the two mutually orthogonal axes. A second adjustment means engages the first and second planar plates for adjusting the first plate relative to the second plate about the second axis.

The mounting assembly of the present invention may further include a clamp secured to a second plate to fixedly secure the mounting assembly to the fixed carrier as well as a limiting means for limiting the amount of adjustment of the first plate relative to the second plate about the second axis.

In this manner, fine precision adjustments in the order of 0.001–0.10 inches about each of the mutually orthogonal axes can easily be accomplished by manually turning the threaded rod fasteners.

BRIEF DESCRIPTION OF THE DRAWINGS

Reference will now be made to the following drawings in which.

DETAILED DESCRIPTION OF THE PREFERRED EMBODIMENT

Figure 1:
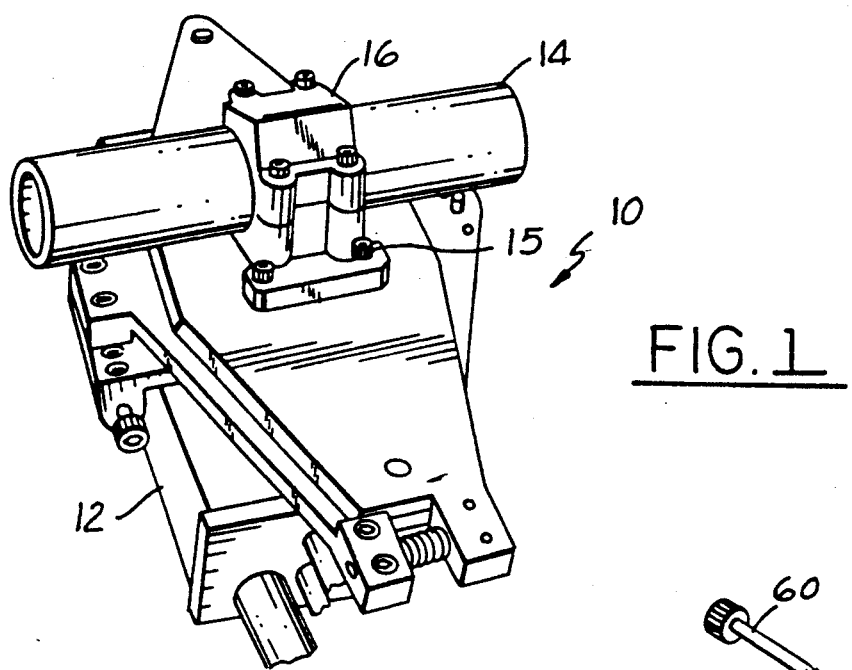
FIG. 1 is a perspective view of a mounting assembly structured in accord with the principles of the present invention.

Referring now to the Figures, FIG. 1 shows an adjustable mounting assembly 10 for adjusting an electro-optical inspection device, such as camera 12, about two mutually orthogonal axes. A clamp 16, mounted to assembly 10 by fasteners 15, secures camera 12 to a substantially fixed carrier 14. The fixed carrier 14 is shown in FIG. 1 as being a tubular member However, the mounting assembly of the present invention may be secured to any of a variety of known carriers by utilizing clamping devices having mating surface configurations. A mounting assembly of the present invention may be used to fasten any of known electro-optical devices to a substantially fixed carrier, such as the camera 12 shown in the figures as well as laser measurement devices and other high resolution sensing devices. The present invention is not meant to be limited solely to the type of electro-optical device disclosed herein.

Figure 2:
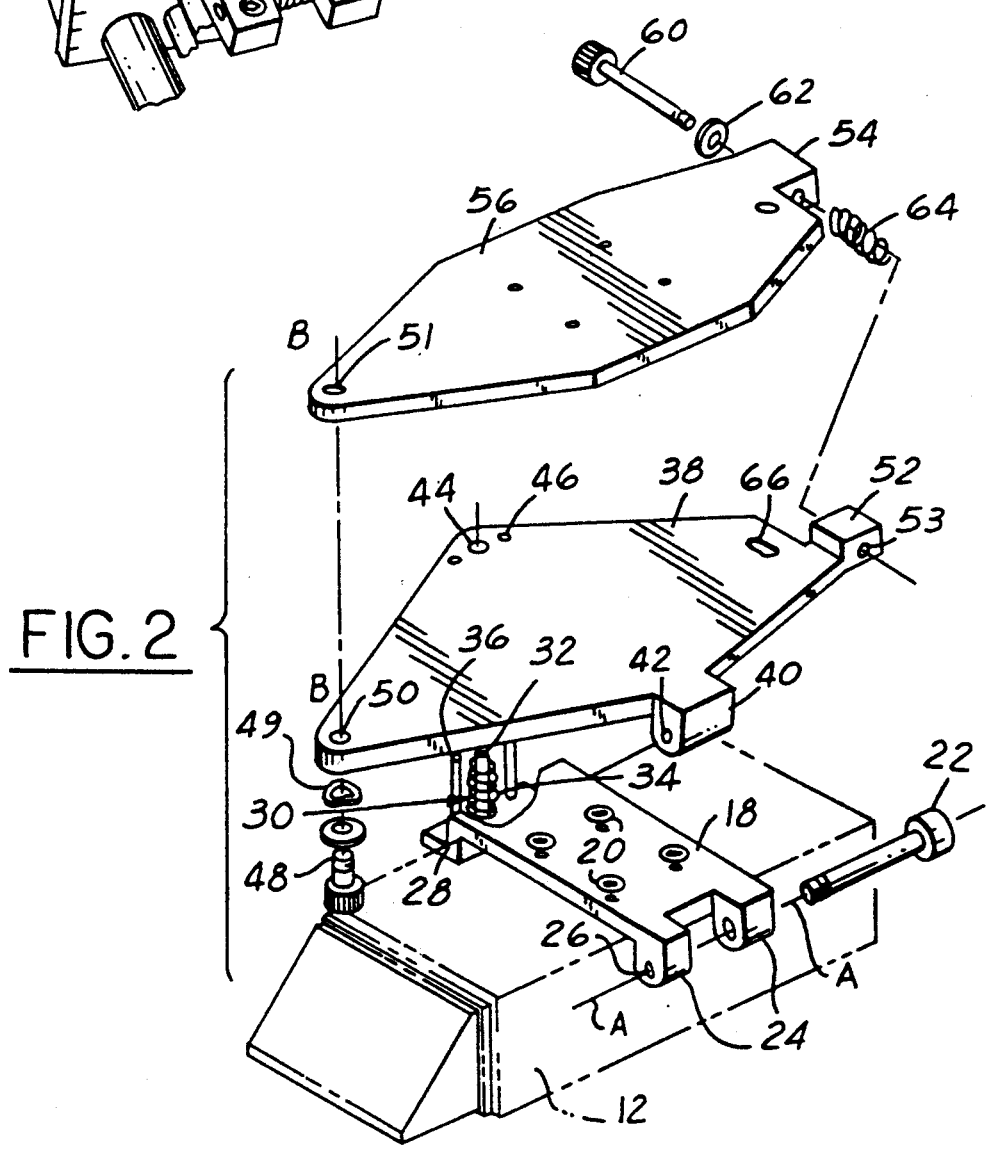
FIG. 2 is an exploded view of a mounting assembly of the present invention.

Referring now to FIG. 2, the mounting assembly 10 of the present invention includes a bracket 18 secured to the electro-optical inspection device, such as camera 12 as well as a first substantially planar plate 38 and a second substantially planar plate 56. Bracket 18 is secured to camera 12 by means of fasteners 20 and includes a pair of tabs 24 defining a space 25 therebetween for receiving tab 40 of the first substantially planar plate 38. Each of tabs 24 includes a hole 26 for receiving a fastening member, such as threaded rod fastener 22 therein. Threaded rod fastener 22, in conjunction with tabs 24, 40 and holes 26 define a means for securing the first plate 38 to bracket 18 and also define a first axis of the two mutually orthogonal axes about which the camera 12 may be pivoted. This first axis about which camera 12 can be pivoted is shown in FIG. 2 as line A—A.

Bracket 18 further includes a stepped surface 28 disposed at an end opposite tabs 24 and which includes a first adjustment means 30. The first adjustment means 30 comprises a threaded rod fastener 32 having a spring 34 circumferentially disposed therearound. As will be described later in detail, the camera 12 may be adjusted pivotally relative to first plate 38 by means of threaded rod fastener 32. The stepped surface further includes a pair of guide posts 36 disposed thereon for insuring alignment of first plate 38 relative to bracket 18.

As described above, the first substantially planar plate 38 includes a tab 40 adapted to fit in the slot 25 defined between tabs 24 of bracket 18. Tab 40 includes hole 42 for receiving threaded rod fastener 22 therethrough. Plate 38 further includes an adjustment hole 44 for receiving threaded rod fastener 32 of the first adjustment means 30 therein as well as a pair of holes 46 for receiving guideposts 36 therein. First plate 38 further includes an aperture 50 receiving a threaded rod fastener 48 therethrough. Threaded rod fastener 48 secures the first plate 38 to the second plate 56 through aperture 51 and defines the second axis about which the camera 12 can be adjusted The second adjustment axis, shown as line B—B in FIG. 2, is mutually orthogonal to the axis defined by line A—A. The threaded rod fastener 48 further includes washers 49 for imparting a slight spring tension between plates 38 and 56.

First plate 38 further includes an adjustment block 52 containing an aperture 53 therethrough for cooperating engagement with a tab 54 of second plate 56. A second adjustment means 58, comprising a threaded rod fastener 60, a washer 62 and a spring 64 circumferentially surrounding threaded fastener 60, engages the first 38 and second 56 plates for rotatably adjusting the first plate 38 relative to the second plate 56 about the axis shown at line B—B. The spring member 64 biases the second plate 56 relative to first plate 38 so that turning the threaded rod fastener 60 causes the first plate 38 to rotate relative to axis B—B defined by threaded rod 48 passing through holes 50 and 51. In the embodiment shown in FIG. 2, the second plate 56 further includes a pin 68 (shown in FIG. 4) which engages a slotted aperture 66 of first plate 38 to limit the amount of adjustment of first plate 38 relative to second plate 56.

Figure 3:
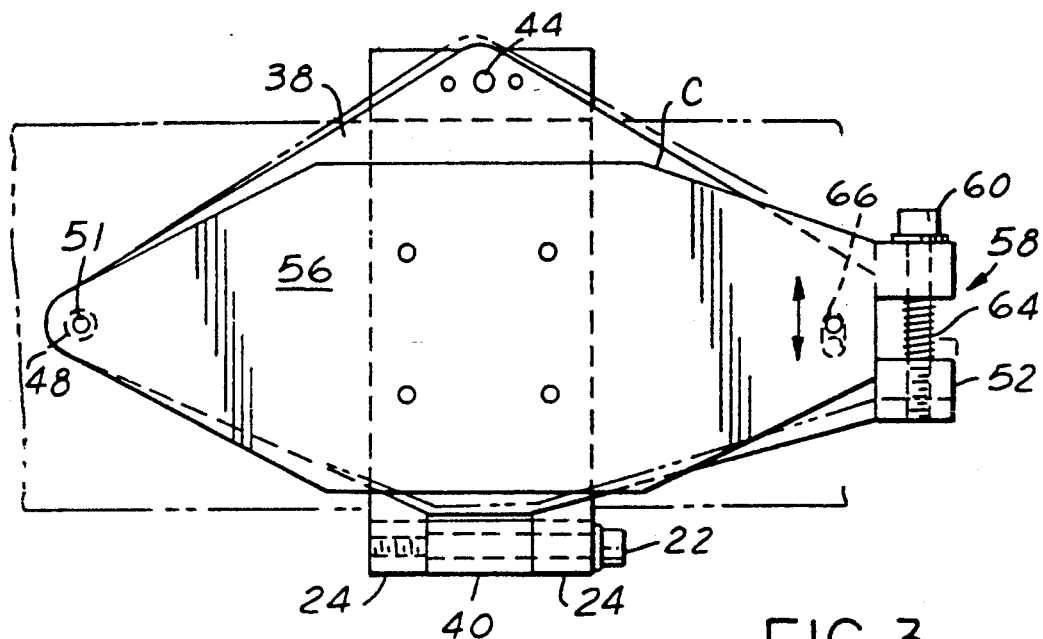
FIG. 3 is a top plan view of a mounting assembly of the present invention shown in two positions.
Figure 4:
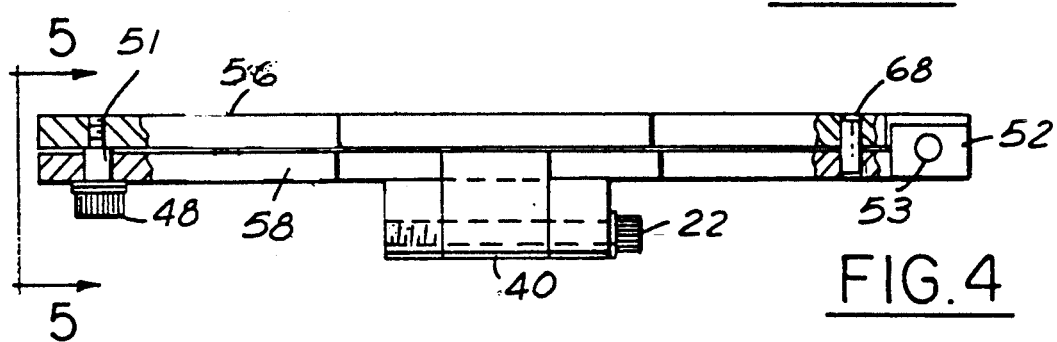
FIG. 4 is a side elevational view along line 4—4 of FIG. 3 of the present invention.

Operation of the mounting assembly of the present invention will now be described with reference to FIGS. 3-5. FIG. 3 shows a top plan view of the present invention without the clamp 16. To adjust a camera or other electro-optical device secured to mounting assembly 10 about the axis B—B defined by threaded fastener 48, threaded fastener 60 is rotated, either manually or with a tool. As described above, the spring member 64 disposed between tab 54 and block 52 biases tab 54 away from block 52. By rotating threaded rod fastener 60 in either a clockwise or counterclockwise position, the first plate 38 will rotate about the axis at 48 from the position shown in solid lines (C) to the position shown in phantom lines at D. In the preferred embodiment, one full rotation of threaded fastener 60 will move plate 38 approximately 0.02 inches (0.508 millimeters) relative to plate 56. As will be readily apparent to those skilled in the art, the pitch angle characteristics of threaded fastener 60 determines the amount of rotation of first plate 38 relative to second plate 56. For example, one full rotation of a threaded fastener having a very fine pitch angle may cause first plate 38 to rotate relative to second plate by 0.0001 inches or less whereas one full rotation of a fastener with a very coarse pitch angle may rotate first plate 38 relative to second plate 56 by 0.05 inches (1.27 millimeters). Furthermore, the threaded rod fastener 60 may easily be rotated in increments less than 1 full rotation, so that very precise adjustments can be made easily. The position of plate 56 remains substantially fixed by the action of clamp 16 (shown in FIG. 1) fixed to carrier 14. Threaded rod 60 may be turned manually by the use of any of a number of known methods, such as a screwdriver, an allen wrench, or by hand. The amount of adjustment of first plate 38 relative to second plate 56 can also be limited by the limiting means 56 defined by pin 68 and slotted aperture 62 as shown in FIG. 4.

Figure 5:
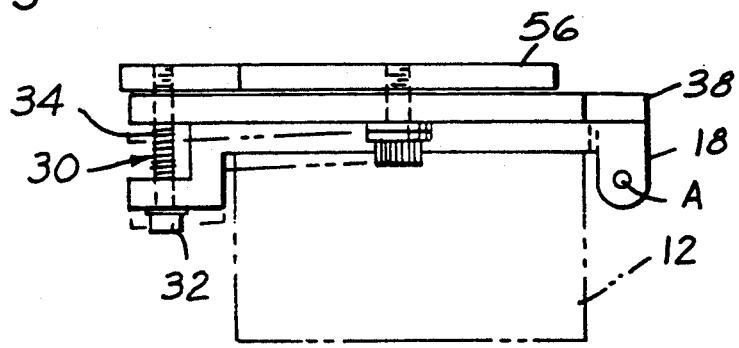
FIG. 5 is a side elevational view along line 5—5 of FIG. 4 showing a mounting assembly of the present invention in two positions.

FIG. 5 shows a side elevational view of the present invention pivotally adjusted about the first axis A—A defined by threaded fastener 22. The camera 12 is pivoted relative to first plate 38 by means of the threaded fastener 32 described above. This adjustment is used primarily to level camera 12 with respect to the object being inspected. To pivot the bracket 18 and camera 12 about the axis shown at A in FIG. 5, the threaded nut fastener 32 is turned either clockwise or counterclockwise generally as explained above with reference to the adjustment of the first plate relative to the second plate. The spring 34 biases first plate 38 away from bracket 18 so that upon movement of threaded rod 32, the bracket 18 will pivot about line A—A to the position shown in phantom FIG. 5. As before, one revolution of threaded fastener 32 equals an adjustment of 0.02 inches (0.508 millimeters) of camera 12 with respect to first plate 38. The threaded rod fastener 32 may be adjusted by any of a number of known methods such as with a screwdriver, an allen wrench or manually by hand and the degree of movement will depend upon the pitch angle of the threaded rod fastener. Threaded fastener also can be turned in increments less than 1 full revolution. By utilizing the threaded rod fasteners 32 and 60, precision adjustment of the electro-optical device relative to the fixed carrier can easily be made.

Various modifications and variations will no doubt occur to those skilled in the art to which this invention pertains. For example, the first and second plates of the present invention may be manufactured from a variety of different materials including metals and synthetic polymeric materials. The bracket of the present invention may also be configured to the shape of the electro-optical device to which it is attached and the first plate and second plate may be manufactured in a variety of configurations. Furthermore, a third plate can be added to the assembly and secured thereto by a fastening member which defines a third axis about which the assembly can be adjusted relative to the fixed carrier. These and all other modifications of the present invention are possible without departing from the spirit and scope of the invention as defined by the appended claims.

What is claimed is:

1. An adjustable mounting assembly for adjusting an electro-optical inspection device secured to a substantially fixed carrier about two mutually orthogonal axes, comprising:
   a bracket adapted to be secured to said inspection device, said bracket including:
   a pair of aligned taps at one end, each tab having an aperture therethrough and defining a space therebetween; and
   a stepped surface at a second end thereof having a pair of guide posts projecting therefrom;
   a first substantially planar plate pivotally secured to said bracket by a first fastening member, said first fastening member defining a first of said two mutually orthogonal axes, said plate including;

a tab adapted to be interposed between said tabs of said bracket and including an aperture for receiving said first fastening member therethrough;

a pair of apertures for receiving said pair of guide posts therein to align said first plate relative to said bracket;

an adjustment block having an aperture therethrough for cooperating engagement with a second substantially planar plate; and a slotted aperture disposed on a planar surface thereof;

first adjustment means disposed between said first plate and said bracket for adjusting said bracket relative to said first plate about said first axis, said means including a threaded nut fastener having a spring circumferentially disposed therearound;

a second substantially planar plate attached to said first plate by a second fastening member, said second fastening member defining a second of said two mutually orthogonal axes, said plate including a pin projecting from a planar surface thereof and adapted to engage said slotted aperture of said first plate to limit the relative movement of said first and second plates about said second axis;

second adjustment means engaging said first and second plates for adjusting said first plate relative to said second plate about said second axis, said adjustment means comprising a threaded nut fastener having a spring circumferentially disposed therearound; and a clamp secured to said second plate operative to fixedly engage said fixed carrier.

2. An assembly according to claim 1, wherein said device can be adjusted about said mutually orthogonal axes between 0.001 and 0.10 inches.

* * * * *